United States Patent [19]
Arai

[11] Patent Number: 5,814,260
[45] Date of Patent: Sep. 29, 1998

[54] METHOD OF CASTING-MASKING-MOLDING THERMOPLASTIC RESIN PRODUCT

[76] Inventor: Takeshi Arai, 32-13-205, Sennari Mansion Hujimi 2-chome, Turugashima-shi, Saitama-ken, Japan

[21] Appl. No.: 639,621

[22] Filed: Apr. 29, 1996

[51] Int. Cl.[6] .......................... B29C 35/02; B29C 39/12; B29C 71/02
[52] U.S. Cl. ...................... 264/245; 264/236; 264/254; 264/255; 264/316; 264/336; 264/337; 264/347; 425/811; 425/DIG. 124
[58] Field of Search .............................. 264/245, 71, 316, 264/254, DIG. 31, 255, 313, 336, 337, 236, 347

[56] References Cited

U.S. PATENT DOCUMENTS

| | | | |
|---|---|---|---|
| 1,597,373 | 8/1926 | Grimm | 264/245 |
| 3,492,391 | 1/1970 | Van Atten | 264/245 |
| 4,882,173 | 11/1989 | La Roche et al. | 264/245 X |
| 5,368,791 | 11/1994 | Uchida et al. | 264/71 X |
| 5,376,321 | 12/1994 | Uchida et al. | 264/245 X |
| 5,445,772 | 8/1995 | Uchida et al. | 264/245 X |
| 5,576,031 | 11/1996 | Uchida et al. | 264/245 X |

FOREIGN PATENT DOCUMENTS

| | | | |
|---|---|---|---|
| 515098 | 11/1992 | European Pat. Off. | 264/245 |
| 571208 | 11/1993 | European Pat. Off. | 264/245 |
| 41668 | 3/1977 | Japan | 264/245 |
| 97196 | 12/1960 | Norway | 264/245 |

*Primary Examiner*—Karen Aftergut
*Attorney, Agent, or Firm*—Lowe Hauptman Gopstein Gilman & Berner

[57] ABSTRACT

A method of casting-masking-molding a thermoplastic resin product, includes the steps of placing a molding sheet 1 on an upper surface of a heated table plate 4, the molding sheet including a molding die 2, and a mask 3 including a plurality of mask constituting pieces 3*a*, 3*b*, 3*c*, ... which are fitted into the molding die and capable of being separated from one another, filling the molding die 2 of the molding sheet 1 in order by pouring a thermoplastic resin liquid 6*a* of a desired color into a portion of the mask 3 from which one of the mask consisting pieces is taken out, then to solidify the poured thermoplastic resin liquid, and repeating in a required number of times the steps of pouring a thermoplastic resin liquid 6*b* of the same color as the desired color or another color different therefrom into another portion of the mask from which another of the mask constituting pieces is taken out, then to solidify the poured thermoplastic resin liquid, and further heating the molded resin body 6 placed on the table plate 4, which is separated from the molding sheet 1 and placed on the table plate 4, and gelatinizing the molded resin body, thereafter to cool the molded resin body.

18 Claims, 2 Drawing Sheets

METHOD OF CASTING-MASKING-MOLDING THERMOPLASTIC RESIN PRODUCT

BACKGROUND OF THE INVENTION

1. Field of the Invention

The present invention relates to a method of casting-masking-molding a thermoplastic resin product.

2. Description of the Relevant Art

Conventionally, the thermoplastic resin products, e.g. key holders having rubber elasticity, accessories such as broaches, fancy small articles, and toys, etc., are formed by the blow molding or injection molding.

However, the blow molding and the injection molding mentioned above are not suitable for the molding of the above-mentioned small articles. This is because the molding dies are so large compared with the articles, thereby the cost is necessarily increased.

SUMMARY OF THE INVENTION

The invention is made to eliminate these problems which exist in the above-mentioned prior art, and it is an object of the invention to provide a method of casting-masking-molding a thermoplastic resin product, which is adapted to prepare a molding sheet in which a molding die having a predetermined shape is formed, and a mask, to pour a thermoplastic resin into the molding die of the molding sheet while heating it, to thereby mold a resin product, having rubber elasticity, of a semi-solid shape having a round upper face, in a short time and at a low cost.

In order to attain the above-mentioned object, there is provided a method of casting-masking-molding a thermoplastic resin product, comprising the steps of placing a molding sheet on an upper surface of a heated table plate, the molding sheet comprising a molding die, and a mask comprising a plurality of mask constituting pieces which are fitted into the molding die and capable of being separated from one another, filling the molding die of the molding sheet by pouring a thermoplastic resin liquid of a desired color into a portion of the mask from which one of the mask consisting pieces is first taken out, then solidifying the poured thermoplastic resin liquid, and repeating for a required number of times the steps of pouring a thermoplastic resin liquid of the same color as the desired color or another color, different therefrom, into another portion of the mask from which another of the mask constituting pieces is taken out, and then solidifying the poured thermoplastic resin liquid until a molded resin body is formed within the molding die of the molding sheet, and further heating the molded resin body placed on the table plate, which is separated from the molding sheet, and gelatinizing the molded resin body, and thereafter cooling the molded resin body to form the thermoplastic resin product.

According to the invention, there are disposed a molding sheet, and a plurality of mask constituting pieces which are fitted into the molding die and capable of being separated from one another, the thermoplastic resin liquid is poured into portions of the mask from which the respective mask constituting pieces are taken out, and these are heated to be molded. So, there can be obtained a beautiful product having rubber elasticity and having a plurality of colors.

Since the method according to the invention is constructed as described above, the effects described below are realized.

(1) There can readily be produced, at low cost a beautiful resin product having an optional shape and having a plurality of colors.

(2) The molded product is a resin product made of a material of rubber elasticity, and having a generally round semi-solid shape at surface shape thereof, so that it can be used as various kinds of small articles such as accessories, fancy small articles, and toys, a commercial value of which can be improved.

(3) Since there are used the molding sheet of silicone rubber which is superior in mold releasability, and the mask, the productivity is improved and the yield of the products is good.

(4) The material cost is not required so much compared with the prior art.

Further objects and advantages of the invention will be apparent from the following description of the preferred embodiment of the invention as illustrated in the accompanying drawings.

DETAILS DESCRIPTION OF THE PREFERRED EMBODIMENT

One embodiment will be described hereinafter with reference to the drawings.

Figure 1:
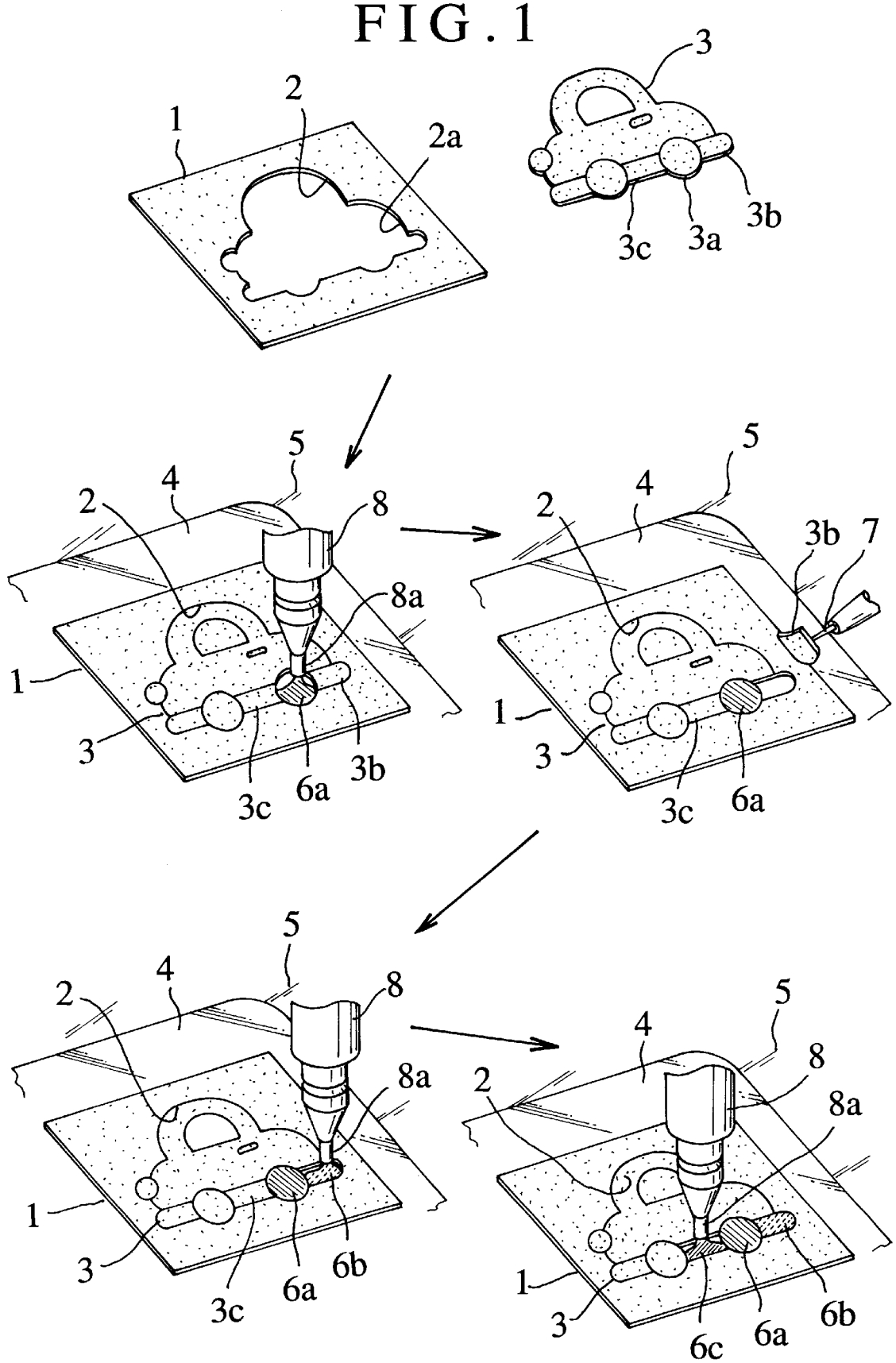
FIG. 1 is an explanatory view showing producing steps in the method according to the invention.
Figure 2:
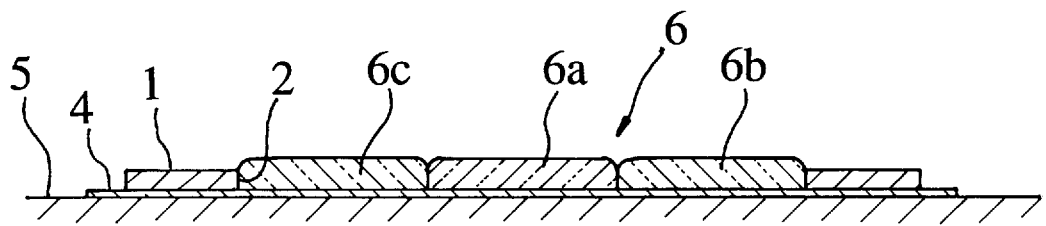
FIG. 2 is an enlarged sectional view of the molded product.
Figure 3:
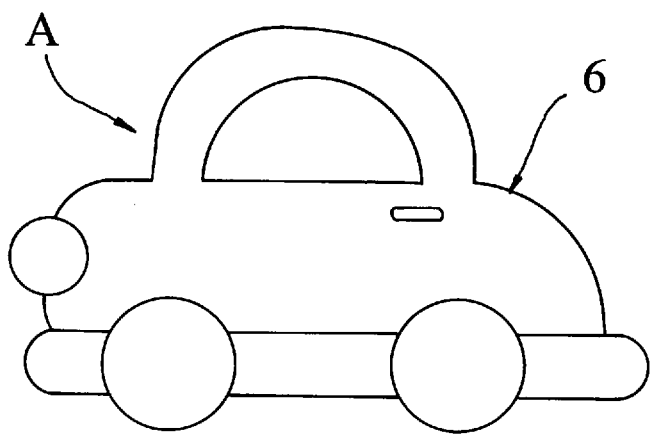
FIG. 3 is a front view of the product produced by the method according to the invention.

FIG. 1 is an explanatory view showing producing steps in the method according to the invention, FIG. 2 is an enlarged sectional view of the molded product, and FIG. 3 is a front view of the product produced by the method according to the invention.

In FIG. 1, reference numeral 1 denotes a molding sheet having a thickness of about 1 to 3 mm. A molding die 2 having an optional shape is formed in the molding sheet 1.

Preferably, the molding die 2 comprises a cutting die 2a shown in FIG. 1. However, a molding recess portion not shown can be used.

Reference numeral 3 denotes a mask which is identical in shape and in size with the above-mentioned molding die 2. The mask 3 is constructed by assembling a plurality of mask constituting pieces 3a, 3b, 3c, . . . which can be separated from one another.

A silicone rubber sheet is the most suitable for the molding sheet 1 in that it is superior in characteristic, i.e. in heat resistance, is easy to be worked, is good in mold releasing property, and is low in cost, etc. However, the other sheet material, e.g. a heat resisting polyamide resin sheet, or a metal plate of stainless, etc. can be used.

Further the molding sheet 1 is placed on a table plate 4 on a condition that the mask 3 is fitted in the molding die 2, and the table plate 4 is p lac ed on a hot plate 5, then they are heated at temperature of 150° to 180° C. during about one minute.

Preferably, the table plate 4 is made of an aluminum plate, whereas it may be made of a steel plate, a stainless plate and other metal plates.

The hot plate 5 can be selected from any one of an electric heater and a gas heater and the like so long as it can make the heating temperature constant.

At a next process, thermoplastic resin liquid 6a is poured into the molding die 2 of the molding sheet 1.

This process will be described in detail hereinbelow.

At first, a part of the mask 3, i.e. a mask constituting piece 3a is taken out from the molding sheet 1 placed on the table plate 4 which is heated as described above, and the thermoplastic resin liquid 6a of a desired color is poured thereinto.

The resin liquid 6a which is poured as described above brings contact with an inner edge of the molding die 2 and outer edges of the other mask constituting pieces 3b, 3c, . . . to stop to flow, and then it swells roundly due to the surface tension thereof to be solidified with a thickness of about 3 to 5 mm.

Next, another mask constituting piece 3b is taken out from the molding sheet 1, and the thermoplastic resin liquid 6b of another color is poured thereinto to be solidified as described above. Then, still another mask constituting piece 3c is taken out of the molding sheet 1, and the thermoplastic resin liquid 6c of still another color is poured thereinto to be solidified.

Thereafter, the thermoplastic resin liquids are poured thereinto to be solidified one after another by repeating the same processes in a required number of times. If the whole of the molding die 2 is filled, the molded resin body 6 shown in FIG. 2, which is separated from the molding sheet 1, is placed on the table plate 4 and heated at a temperature of 200° to 300° C. during about two to five minutes to thereby be gelatinized. After the gelatinisation thereof, it is water-cooled or naturally cooled, then is torn off the table plate 4. So, there can be obtained a beautiful product A having rubber elasticity and having a plurality of colors, shown in FIG. 3.

This product A can be used as key holders having rubber elasticity, accessories such as broaches, fancy small articles, toys, etc. according to the shape of the molding die 2 of the molding sheet 1.

In the embodiment illustrated in the drawings, a needle 7 such as a drawing pin is used when the respective mask constituting pieces 3a, 3b, 3c, . . . are taken out from the molding sheet 1, whereas the other tools or only hand can be used.

A soft vinyl chloride resin is suitable for the thermoplastic resin liquid 6a, 6b, 6c, . . . which is a material of the product A, whereas all sorts of the materials e.g. vinyl polymer and nylon can be allowed so long as the material can be applied with the surface tension by the heating, and can be molded in a round semi-solid shape body having rubber elasticity, shown in FIG. 2. As shown in FIG. 1, the resin liquid is contained into a tubular container 8, and squeezed out of a nozzle 8a disposed on a leading end of the container 8, thereby being flowed into the molding die 2 of the molding sheet 1.

Many widely different embodiments of the invention may be constituted without departing from the spirit and scope of the invention. It should be understood that the invention is not limited to the specific embodiments described in the specification, except as defined in the appended claims.

What is claimed is:

1. A method of molding a thermoplastic resin product, comprising the steps of:

placing a molding sheet comprising a molding die and a mask on an upper surface of a heated table plate, said mask comprising a plurality of mask constituting pieces which are fitted into said molding die and capable of being separated from one another;

filling said molding die of said molding sheet by pouring a thermoplastic resin liquid of a desired color into a portion of said mask from which one of said mask constituting pieces is first taken out, then solidifying said poured thermoplastic resin liquid, and repeating for a required number of times the steps of pouring a thermoplastic resin liquid of a same color as said desired color or of another color different therefrom into another portion of said mask from which another of said mask constituting pieces is taken out, and then solidifying said poured thermoplastic resin liquid until a molded resin body is formed within said molding die of said molding sheet placed on said heated table plate; and further heating said molded resin body, which is separated from said molding sheet, on said table plate and gelatinizing said molded resin body, and thereafter cooling said molded resin body to form said thermoplastic resin product.

2. A method of molding a thermoplastic resin product of a predetermined shape within a molding sheet, comprising the steps of:

placing a molding sheet comprising a molding die formed of an opening in said molding sheet and having said predetermined shape on an upper surface of a heated table plate, said molding sheet including a mask having a plurality of fitted mask constituting pieces in said opening;

filling said opening of said molding sheet by implementing the steps of taking out one of said mask constituting pieces from a portion of said mask in said opening, pouring a thermoplastic resin liquid of a desired color into said portion of said mask within said molding sheet, then solidifying said poured thermoplastic resin liquid in said portion of said mask;

repeating for a required number of times the steps of taking out another of said mask constituting pieces from another portion of said mask in said opening, pouring a thermoplastic resin liquid of a same color as said desired color or of another color different therefrom into said another portion of said mask within said molding sheet, and then solidifying said poured thermoplastic resin liquid in said another portion of said mask until a molded resin body of a predetermined shape is formed within said opening of said molding sheet;

heating and gelatinizing said molded resin body on said table plate, and thereafter cooling said molded resin body to form said thermoplastic resin product of said predetermined shape.

3. A method as recited in claim 2, wherein said step of placing a molding sheet comprises placing a molding sheet having a thickness approximately in a range of 1 mm to 3 mm on said upper surface of said heated table plate.

4. A method as recited in claim 3 comprising the further step of separating said molded resin body from said molding sheet and wherein said step of heating and gelatinizing said molded resin body comprises heating said molded resin body at a temperature in a range of 200° C. to 300° C. for two to five minutes, thereby to gelatinize said molded resin body to said predetermined shape.

5. A method as recited in claim 2 comprising the further step of separating said molded resin body from said molding sheet and wherein said step of heating and gelatinizing said molded resin body comprises heating said molded resin body at a temperature in a range of 200° C. to 300° C. for two to five minutes, thereby to gelatinize said molded resin body to said predetermined shape.

6. A method as recited in claim 2, comprising the further step of providing a mask having substantially an identical shape as said molding die and substantially an identical volume into said molding die.

7. A method as recited in claim 2, wherein said molding sheet comprises a silicon rubber sheet and said step of placing a molding sheet comprises placing a silicon rubber sheet on said upper surface of said heated table plate.

8. A method as recited in claim 2, wherein said molding sheet comprises a silicon rubber sheet and said step of placing a molding sheet comprises placing a silicon rubber sheet having a thickness approximately in a range of 1 mm to 3 mm on said upper surface of said heated table plate.

9. A method as recited in claim 2, wherein said molding sheet comprises a heat resisting polyamide resin sheet and said step of placing a molding sheet comprises placing a heat resisting polyamide resin sheet on said upper surface of said heated table plate.

10. A method as recited in claim 2, wherein said molding sheet comprises a heat resisting polyamide resin sheet and said step of placing a molding sheet comprises placing a heat resisting polyamide resin sheet having a thickness approximately in a range of 1 mm to 3 mm on said upper surface of said heated table plate.

11. A method as recited in claim 2, wherein said molding sheet comprises a metal plate of stainless steel and said step of placing a molding sheet comprises placing a metal plate of stainless steel on said upper surface of said heated table plate.

12. A method as recited in claim 2, wherein said molding sheet comprises a metal plate of stainless steel and said step of placing a molding sheet comprises placing a metal plate of stainless steel having a thickness approximately in a range of 1 mm to 3 mm on said upper surface of said heated table plate.

13. A method of molding a thermoplastic resin product of a predetermined shape and having a rubbery elastic characteristic, comprising the steps of:

providing a mask comprising a plurality of mask constituting pieces fitted into a molding die formed as an opening of said predetermined shape in a molding sheet;

then placing said molding sheet including said mask within said opening on an upper surface of a heated table plate;

filling said molding die of said molding sheet by implementing the steps of taking out one of said mask constituting pieces from a portion of said mask in said opening, pouring a thermoplastic resin liquid of a desired color into said portion of said mask within the opening in the molding sheet, then solidifying said poured thermoplastic resin liquid in said portion of said mask;

repeating for a required number of times the steps of taking out another of said mask constituting pieces from another portion of said mask in said opening, pouring a thermoplastic resin liquid of a same color as said desired color or of another color different therefrom into said another portion of said mask within the opening in the molding sheet, and then solidifying said poured thermoplastic resin liquid in said another portion of said mask until a molded resin body of a predetermined shape is formed within said opening of said molding sheet;

heating and gelatinizing said molded resin body on said table plate, and thereafter cooling said molded resin body to form said thermoplastic resin product of said predetermined shape.

14. A method as recited in claim 13 comprising the further step of heating said molding sheet, molding die and mask therein on said heated table plate at a temperature in a range of 150° C. to 180° C. for one minute before said step of filling said molding die.

15. A method as recited in claim 14 wherein said step of solidifying said poured thermoplastic resin liquid in said portion of said mask comprises swelling said resin liquid roundly to a thickness in a range of about 3 mm to about 5 mm by heating.

16. A method as recited in claim 15 comprising the further step of separating said molded resin body from said molding sheet, and wherein said step of heating and gelatinizing said molded resin body comprises heating said molded resin body at a temperature in a range of 200° C. to 300° C. for two to five minutes, thereby to gelatinize said molded resin body to said predetermined shape.

17. A method as recited in claim 13 wherein said step of solidifying said poured thermoplastic resin liquid in said portion of said mask comprises swelling said resin liquid roundly to a thickness in a range of about 3 mm to about 5 mm by heating.

18. A method as recited in claim 13 comprising the further step of separating said molded resin body from said molding sheet and said step of heating and gelatinizing said molded resin body comprises heating said molded resin body at a temperature in a range of 200° C. to 300° C. for two to five minutes, thereby to gelatinize said molded resin body to said predetermined shape.

* * * * *